(12) United States Patent
Salminen

(10) Patent No.: US 8,165,070 B2
(45) Date of Patent: Apr. 24, 2012

(54) HETEROGENEOUS NETWORK SYSTEM, NETWORK NODE AND MOBILE HOST

(75) Inventor: Reijo Salminen, Nastola (FI)

(73) Assignee: AB Seesta Oy, Nastola (FI)

( * ) Notice: Subject to any disclaimer, the term of this patent is extended or adjusted under 35 U.S.C. 154(b) by 620 days.

(21) Appl. No.: 10/592,240

(22) PCT Filed: Mar. 10, 2005

(86) PCT No.: PCT/FI2005/050073
§ 371 (c)(1),
(2), (4) Date: Aug. 20, 2008

(87) PCT Pub. No.: WO2005/086422
PCT Pub. Date: Sep. 15, 2005

(65) Prior Publication Data
US 2008/0298313 A1    Dec. 4, 2008

(30) Foreign Application Priority Data

| Mar. 10, 2004 | (FI) | 20040378 |
| Mar. 10, 2004 | (FI) | 20040379 |
| Mar. 10, 2004 | (FI) | 20040380 |

(51) Int. Cl.
*H04W 4/00* (2009.01)
(52) U.S. Cl. ........ 370/329; 370/328; 455/434; 455/445; 455/452.2
(58) Field of Classification Search .......... 370/328–329; 455/434, 445, 452.2
See application file for complete search history.

(56) References Cited

U.S. PATENT DOCUMENTS

| 5,528,664 | A | 6/1996 | Slekys et al. |
| 5,657,487 | A | 8/1997 | Doner |
| 6,445,917 | B1 * | 9/2002 | Bark et al. ............ 455/423 |
| 6,643,782 | B1 | 11/2003 | Jin et al. |
| 7,006,472 | B1 * | 2/2006 | Immonen et al. ........ 370/332 |
| 7,123,910 | B2 * | 10/2006 | Lucidarme et al. ...... 455/434 |
| 2002/0085503 | A1 | 7/2002 | Hulyalkar et al. |
| 2002/0136226 | A1 | 9/2002 | Christoffel et al. |
| 2002/0152319 | A1 * | 10/2002 | Amin et al. ........... 709/232 |
| 2003/0048762 | A1 | 3/2003 | Wu et al. |

(Continued)

FOREIGN PATENT DOCUMENTS
EP   0 936 777   8/1999
(Continued)

OTHER PUBLICATIONS

David A. Wallace, "802.11 Network Security—Standards & Strategies", RSA Conference, Feb. 26, 2004, pp. 1-20.

(Continued)

*Primary Examiner* — Jinsong Hu
*Assistant Examiner* — Qun Shen
(74) *Attorney, Agent, or Firm* — Arent Fox LLP

(57) ABSTRACT

The invention relates to a system that dynamically integrates a set of communication networks to increase the overall heterogeneous network system performance and capabilities. In particular, the present invention relates to a technique of providing a Dynamic Heterogeneous Network System, and providing a Network Node entity and a Mobile Host entity into the system to support the heterogeneous network. The network system according to the present invention has an architecture that includes at least five building blocks including a mobile host (1), an access network (7), a network node (2), an AAA (Authentication, Authorization and Accounting) node (13), and an external network (3).

19 Claims, 13 Drawing Sheets

U.S. PATENT DOCUMENTS

| | | | |
|---|---|---|---|
| 2003/0048773 A1* | 3/2003 | Wu et al. ................. | 370/352 |
| 2003/0050061 A1 | 3/2003 | Wu et al. | |
| 2003/0055964 A1 | 3/2003 | Rezaiifar et al. | |
| 2004/0022212 A1 | 2/2004 | Chowdhury et al. | |
| 2004/0028017 A1 | 2/2004 | Whitehill et al. | |

FOREIGN PATENT DOCUMENTS

| | | |
|---|---|---|
| EP | 1 089 461 | 4/2001 |
| EP | 1 257 141 A1 | 11/2002 |
| JP | 2001-272660 A | 10/2001 |
| JP | 2001-272661 A | 10/2001 |
| JP | 2001-317471 A | 11/2001 |
| WO | WO 99/63689 | 12/1999 |
| WO | 03/001742 A1 | 1/2003 |
| WO | 03/055261 A1 | 7/2003 |
| WO | 03/065682 A1 | 8/2003 |
| WO | 03/087869 A1 | 10/2003 |

OTHER PUBLICATIONS

Anon, "Is Cellular Handoff Nigh?" Wi-Fi Planet, Feb. 9, 2004, Retrieved from the Internet: URL: www.fi-fiplanet.com/columns/print.php/3310401>.

David Johnston, "802.21-L2 Services for Handover Optimization", 802.21 IETF DNA R1, 'Online!, Mar. 4, 2004, pp. 1-19, Retrieved from Internet: URL:http://www.ieee802.org/21/march04_meeting_docs/21-04-0006-00-0000-IETF_DNA.pdf>.

Xiaoyu Liu, et al., "Interaction between L2 and Upper Layers in IEEE 802.21", 802.21-L2 Upper Layer Interaction R, 'Online! Mar. 4, 2004, pp. 1-11, Retrieved from the Internet: URL:http://www.ieee802.org/handoff/march04_meeting_docs/802.21_L2_upper_layer interaction_r1.ppt>.

Reijo Salminen, "Architecture of a Dynamic Heterogeneous Network System" 802.21—Seamless Media Independent Handover WG, 'Oline!, May 11, 2004-May 13, 2004, pp. 1-23, Retrieved from the Internet: URL:http://www.ieee802.org/21/may04_meeting_docs/21-04-0043-00-0000-Seesta.pdf>.

Ashutosh Dutta et al., "Multimedia SIP sessions in a Mobile Heterogeneous Access Environment" 6 pages.

Analysis of IEEE 802.11e and Application of Game Models for Support of Quality-of-Service in Coexisting Wireless Networks, Jun. 30, 2003, 280 pages.

* cited by examiner

HETEROGENEOUS NETWORK SYSTEM, NETWORK NODE AND MOBILE HOST

CROSS REFERENCE TO RELATED APPLICATIONS

This application is a National Stage entry of International Application No PCT/FI2005/050073 filed Mar. 10, 2005, which claims benefit of Finland Application No. 20040378 filed Mar. 10, 2004; Finland Application No. 20040380 filed Mar. 10, 2004; and Finland Application No. 20040379 filed Mar. 10, 2004, the entire specifications, claims, and drawings of which are incorporated herein by reference.

BACKGROUND OF THE INVENTION

1. Field of the Invention

The present invention relates to a system that dynamically integrates a set of communication networks to increase the overall heterogeneous network system performance and capabilities. In particular, the present invention relates to a technique of providing a Dynamic Heterogeneous Network System, and providing a Network Node entity and a Mobile Host entity into the system to support the heterogeneous network as described in the independent claims.

2. Related Art

Even though there is a large number of interest groups worldwide that do recognize a common target—to minimize the number of various network techniques used in the markets—there is today and also in the foreseeable future will be a large number of wired and wireless systems standardized and used both locally and globally.

Some of these network techniques have their roots quite far in the past, and they may have overcome a substantial amount of extensive improvement and optimization activities during the years that they have been in use, whereas some of the techniques are still in their early stages in their lifetime and can be based on using very sophisticated new methods to fulfill the requirements put towards them.

Some of these above mentioned new methods may have been impossible to realize in commercial products until the recent advances in for example circuit technologies and processing platform capabilities have come available.

Also the differences in the requirements put on the various network techniques have a deep influence on the level of ambition how the systems have consequently been implemented—some have been developed to be operational practically everywhere in the world with even beyond 99,999% of time availability requirements and data throughput rates being of tens of kilobits per second, and some are targeted for small personal area coverage with very low cost and low power consumption requirements and data throughput rates of even hundreds of megabits per second, the rest of the systems being positioned in between these two extremes. Also some systems are optimized for circuit switched services like voice, and some are optimized for packet switched services like internet browsing, computer networking and electrical mail.

BRIEF SUMMARY OF THE INVENTION

The above mentioned scattered situation, combined with the fact that each internationally standardized cellular system generation is remarkably more complicated and expensive to develop than it's predecessors, and that also the operational cost structure of the new complete system generations can be difficult to estimate in advance, an ever growing number of experts in the field are looking for alternatives for the development of complete systems at each new system generation. One possibility is to use the existing and new network technologies together, which is the trend in the 4G research and standardization work, and to let the complete system in harmony use the best suited parts of each technology available in the particular traffic situation, and by that way gain both economical and technical synergies. The current invention is one such an approach.

The current state of the art is that there exists a number of access technologies, both wired and wireless, examples of the wireless are cellular systems (NMT, GSM, AMPS, CDMA, PDC, GPRS, EDGE, WCDMA, CDMA-2000, Inmarsat) and examples of wireless network systems are the standards for restricted geographic area service coverage purposes (WPAN, WLAN, WMAN, WBMA, UWB, Bluetooth, ZigBee, Infrared). Then there exists several access technologies for wired accesses, examples being ADSL, SDSL, VDSL, Cable TV based systems, modem based systems over public telephone lines, HomePNA, FTTH. There also exist several efforts to combine various cellular and local area based systems together using different techniques. The common denominator to these approaches is that they rely on performing inter-system roaming or even inter-system handovers (also known as vertical handovers) to serve the users in the most suitable way. A very advanced approach in this field is described in patent applications publications US 2003/0048762 A1, US 2003/0048773 A1, US 2003/0050061 A1 and in patents (JP) 2001-272660, 2001-272661, 2001-317471 where a number of wireless communication systems are seamlessly combined by using a separate basic access network to integrate the various systems together and use SDR technologies to enable the mobile host to communicate with the different wireless systems mainly one at a time using horizontal and vertical handovers. The system defined in the above mentioned patents is also known in literature as the MIRAI Architecture. Also valuable reading about the IETF Session Initiation Protocol (SIP) usage in heterogeneous networks as known in prior art is Schultzrinne et al. 'Multimedia SIP sessions in a Mobile Heterogeneous Access Environment'. S. Mangold has written a comprehensive study of the 802.11e quality of service aspects in his dissertion: 'Analysis of IEEE 802.11e and Application of game Models for support of Quality-of-Service in Coexisting Wireless Networks'. For a person familiar of the field it is clear that giving a comprehensive description of the state of the art of such a vast area being under an evolutionary turbulence never seen before in the history of telecommunication, is difficult, especially if it must be done briefly. The above listed documents are selected to give a very simple guideline to the reader of the situation.

The current invention will enable heterogeneous communication over an arbitrary number of access technologies (wireless or wired) simultaneously and the connections will be dynamically reconfigured when needed to sustain the required service level to the user. To initially access the user the mobility management and authentication and authorization functionalities existing in the access networks as known in prior art are used, thus eliminating the need to construct an expensive separate access network only for that purpose. Also the mobile host is a concept of adding together several mobile host unit entities with various capabilities and which then respectively communicate with each other. The current invention is also avoiding the inter-network (also known as vertical) handovers, since they are very expensive and complicated to develop, test and use reliably enough, and relies on ordinary connection setup and release mechanisms and only informs the user applications when a network reconfiguration is to be performed. Said procedure also includes other necessary preparations performed when a subscriber starts to use the resources in the target network, such as authenticating the subscriber in said network using the authentication mechanisms used in the network in question.

Also the mobile host, once provided with access rights in the heterogeneous network, is the master controlling entity for traffic routing in the heterogeneous network, this approach has several benefits when compared to the prior art more centralized traffic control within the heterogeneous network, namely that the (re)configuration decisions of the connections are done close to the source of the information indicating why and how the (re)configuration activities are to be done, and thus savings in signaling over the bandwidth limited access interfaces and also smaller delays in the response times can be gained. Also the trend in the evolution of circuit technologies and the processing power respectively, as well as advances in the research of digital signal processing of radio signals, is indicating of having increasingly more powerful and functionally more advanced portable systems available on the market in the future, and in this kind of a scenario it is a natural evolution to move also more of the network control related processing responsibility closer to the network leaves. Another major benefit of having the mobile host controlling the traffic routing in the heterogeneous network is to increase the overall robustness of the complete system remarkably, since the access networks are in most cases overlapping and in the current invention an outage visible to the end user would need normally several simultaneous serious problems in the system, thus the heterogeneous approach is decreasing the likelihood of such a situation remarkably when compared to the networks of the prior art.

Since the mobile host is in the center of action when it comes to detection of the degradations in the actual connections, the recovery actions can be initiated immediately, which is a very important factor when increasing overall system robustness and minimizing the duration of the degradations in question. Also moving more responsibility of the control of the heterogeneous network towards the mobile host in the architecture of the current invention increases the possibilities to develop the system so that the network nodes involved in the traffic routing in the heterogeneous network do not need to store permanent subscriber related data in them, as the situation is in the prior art networks. The lack of subscriber related data in the network nodes involved in the traffic routing eases the installation and operation of the network remarkably.

One benefit of the present invention is to use standard system components as much as possible, and to minimize the need of additions or changes in them. This enhances competition and makes the complete system cheaper to install and to operate.

The current invention is characterized by the contents of the independent claims.

BRIEF DESCRIPTION OF THE DRAWINGS

The following text gives a brief description of the drawings.

DETAILED DESCRIPTION

Figure 1:
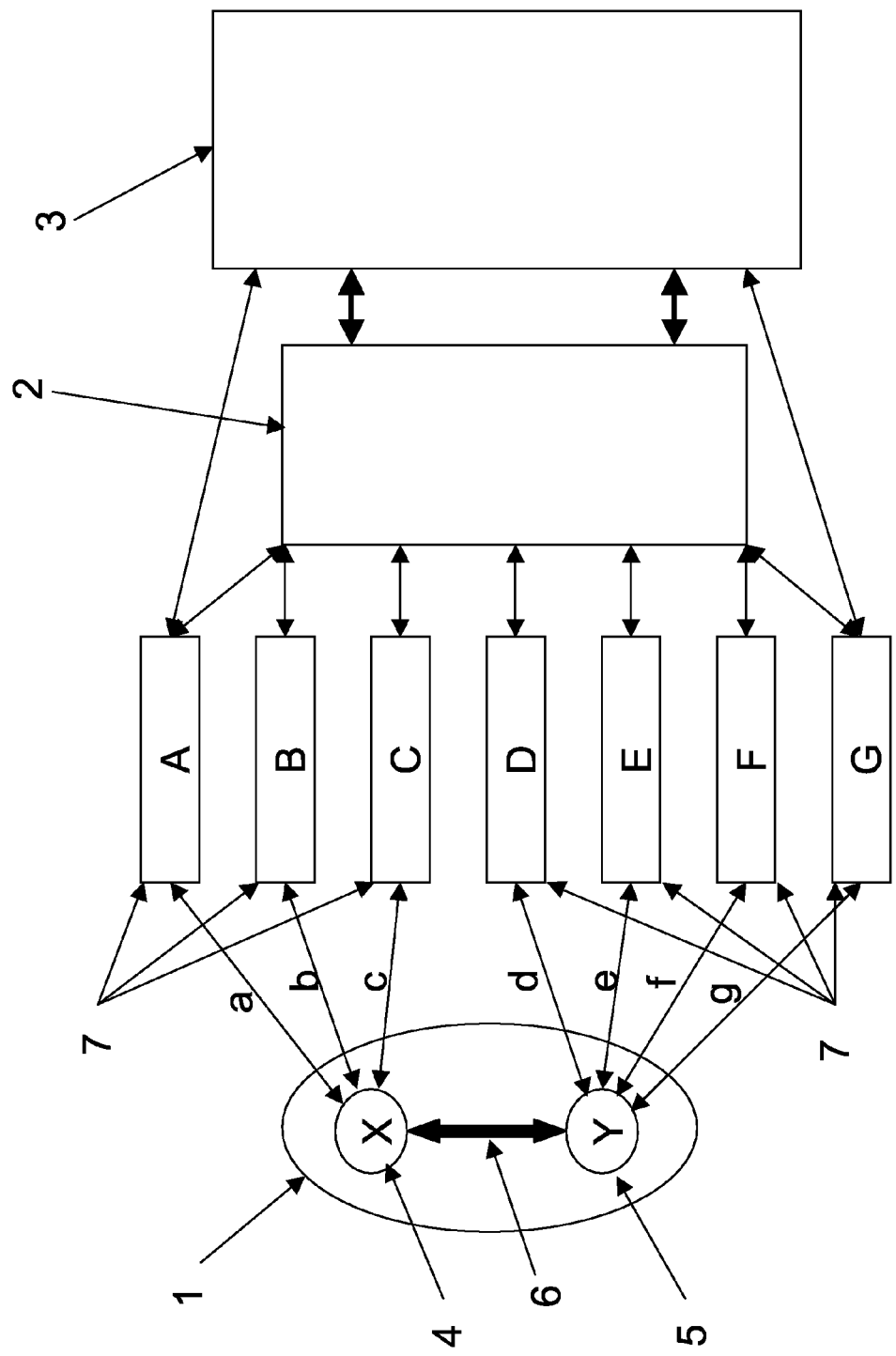
FIG. 1 is an explanatory architectural drawing of how the heterogeneous network constitutes of individual access networks, and how mobile host, access networks, network node and external network are connected in the heterogeneous network.

The identification of the entities in the drawings is the following: 1 Mobile Host, 2 Network Node, 3 External Network, 4 Mobile Host Unit X, 5 Mobile Host Unit Y, 6 interface between Mobile Host Units X and Y, 7 Access Network, A-C Access Networks that Mobile Host Unit X has capabilities to communicate with, a-c the access interfaces to the previous networks, D-G Access Networks that Mobile Host Unit Y has capabilities to communicate with, d-g the access interfaces to the previous networks, 8 Control Logic function in the Mobile Host, 9 Traffic Routing function in the Mobile Host, 10 Control and Measurement Database function in the Mobile Host, 11 Applications using the communication services of the heterogeneous network, 12 Access Points (also base stations or wired access) of the individual access networks, 13 AAA—Authentication, Authorization and Accounting node of the heterogeneous network, 14 AAA—Authentication, Authorization and Accounting interface function in the Network Node, 15 Control Logic function in the Network Node, 16 Traffic Routing function in the Network Node, 17 Session Initiation Protocol (SIP) INVITE message, 18 AAA protocol (DIAMETER) Query for requesting subscription information of the user, 19 SIP indication (SIP: 100 Trying), 20 AAA protocol (DIAMETER) Response for 18, 21 Initial connection establishment procedure to the mobile host in one access network where the mobile host is connected to, 22 procedure for registration, AAA and user identity allocation in one access network through which the mobile host is initiating a communication session, 23 a message containing the user identity allocated in 22, 24 SIP indication (SIP: 180 Ringing), 25 the same procedure as 22 but for another access network domain, 26 a message containing the user identity allocated in 25, 28 SIP indication (SIP: 200 OK), 29 SIP acknowledgement (SIP: ACK), 30 a procedure where the media sessions are set up between the external network and each of the user identities allocated in 22 and 25 in the mobile host, the details of this procedure are not shown in more detail since they are not relevant for the current invention, 31 SIP termination message (SIP: BYE), 33 Gateway GPRS Support Node (GGSN), 34 Home Location Register (HLR), 35 Serving GPRS Support Node (SGSN), 36 a packet data protocol (PDP) PDU message, 37 Mobile Application Part (MAP) Send Routing Information (SRI) message for GPRS, 38 Acknowledgement message for 37, 39 PDU Notification Request message, 40 PDU Notification Response message, 41 Request PDP Context Activation message, 42 PDP Context Activation Procedure, 43 Establish (PAN) connection procedure, 44 Procedure for scanning the available access networks and obtaining their identities, 45 message containing information of the available access networks, their QoS characteristics and control information related to the particular access networks fetched from the mobile host control and measurement database, 46 message containing the access network candidate list, QoS contracts of each access network, authentication information for each access network, 47 a procedure where the mobile host preparations are performed for roaming into the access networks, such as authentication of the subscriber in said access network, using the information received in 46 and obtains identities, such as IP addresses, and QoS information of the connections, 48 message containing the user identities, QoS information of the connections and control data fetched from the control and measurement database at the mobile host, 49 fork the SIP INVITE to the user identities, 50 Activate PDP Context Request message, 51 Create PDP Context Request message, 52 Create PDP Context Response message, 53 Activate PDP Context Accept message, 54 802.11x Access Point (AP), 55 802.11 MAC Management Action message ADDTS QoS Action Request message containing QoS request information for the traffic stream, 56 the process where the user is authorized and QoS request is being analyzed, 57 802.11 MAC Management Action message ADDTS QoS Action Response QoS offerings information, 58 a new traffic stream allocation sequence if the response code for 57 suggested changes to the attempted traffic stream creation, 59 procedure where the connections are established, QoS control and measurement information negotiated between the Mobile Host Unit Y 5 and access point 54, 60 CAP QoS (+) CF-poll containing the results of the QoS measurements done at the AP 54 side, 61 store the results from 60 into the control and measurement database 10, 62 QoS (+) CF-ACK with QoS measurements from the Mobile Host Unit Y 5, 63 the AP 5) processes the information of 63, 64 the example procedure of periodic QoS negotiation in an 802.11e supporting 802.11x WLAN environment, 65 Target Beacon Transmission Time (TBTT), 66 Beacon, 67 QoS (+) CF-poll, 68 Request to send (RTS), 69 Clear to send (CTS), 70 Data (MSDU), 71 Data (ACK), 72 CF-end, 73 Contention Free Period (CFP), 74 Contention Period (CP), 75-82 different access network technologies, 83 different access network domains (for example network operators) within the individual access network technologies, 84 data record of one access network instance, 85 data record of highest QoS service class, 86 data record of higher QoS service class, 87 data record of medium QoS service class, 88 data record of lower QoS service class, 89 QoS of the connection detected as not fulfill the requirements, 90 a message indicating about connection re-routing, 91 a procedure for tearing down a QoS degraded connection and releasing the resources and updating the control and measurement database in the mobile host accordingly.

The following gives a description of the preferred embodiments.

To achieve the objects explained above, the current invention uses the following means:

In a heterogeneous network system that integrates communication systems, a common network node that supports the plurality of the access networks and performs traffic functions and authentication, authorization and accounting functions in cooperation with the mobile host.

The heterogeneous network system allows the mobile hosts to roam simultaneously in a plurality of access networks, the system uses existing mobility management and authentication/authorization functionalities of the access networks to locate the roaming mobile host and to establish initial communication between the network node and the mobile host.

The mobile host has capabilities to communicate simultaneously over a plurality of access networks, which can consist of both wired and wireless access networks.

With the established initial communication between the network node and the mobile host, the authentication and authorization of the subscriber in the heterogeneous network is performed, and a plurality of simultaneous connections across the plurality of the access networks is established. The mobile host is authenticated and authorized in each of the access network based on the information received from the network node, and the identities, such as IP addresses, used by the mobile host in each access network are allocated and stored in the mobile host and communicated at the initiation of the sessions. The actual initialization of establishment of the requested sessions is based on the quality of service requirements for the connections, the authorization information of the subscriber in the heterogeneous network, and the control information stored in the mobile host.

The Quality of Service of the established connections are monitored by the mobile host and by the counter partying access network entities, and the information is made available in the mobile host for connection setup, release and reconfiguration decisions for the network transition from source network to the target network, from both the measurements in the mobile host and from the measurements in the counter partying access network entity. The Quality of Service is measured locally by the mobile host and by the counter partying access network entities, and the end-to-end Quality of Service is measured by the user applications. It is the local Quality of Service measurements that are used in the decisions to perform connection reconfigurations within the heterogeneous network during traffic. The end-to-end Quality of Service observations are up to the applications to act upon.

The Quality of Service is measured as data throughput, delay, jitter, packet error rates and packet loss rates. The Quality of Service requirements for the connections are a subset of these, added with the service priority class of the connection.

The nature of the connection reconfigurations is to use the connection establishment and teardown mechanisms when performing the re-routing of a particular connection over an alternative route in the target network during operation. This eliminates the need to create complex handover mechanisms between the numerous access network technologies, also other necessary preparations, such as authentication of the subscriber in the target network with the mechanisms used in said network, can be performed in a simple and controlled fashion using said principles. The applications are informed about the re-routings so they can perform proper corrective activities if needed.

The heterogeneous network system relies on that the horizontal handovers are performed within the access networks without the need of the heterogeneous network layer to participate in the process, as long as for example the Quality of Service requirements are met.

An embodiment of the present invention is explained below with references to the drawings.

Note that the access technologies in the drawings are wireless, but the wired access technologies can also be used in any combination together with the wireless access technologies within the invention.

The architectural relationships between the entities in the heterogeneous network are shown in FIG. 1 As can be seen in FIG. 1 the mobile host 1 communicates with a number of access networks 7, A-G, a-g connected to the network node 2 and to the external network 3. Due to drawing technical issues only access networks A and G are connected directly to the external network 3, any number of access networks 7 can have direct connections to the external network 2 in the current invention.

In the FIG. 1 the Mobile Host 1 consists of two Mobile Host Units, Mobile Host Unit X 4 and Mobile Host Unit Y 5. The current invention is not limiting the number of the units—which are characterized by being capable to support a subset of the total number of access techniques supported by the heterogeneous network—by any means; it/they only need to have means to support the functionality of the heterogeneous network architecture. As an example the Mobile Host Unit X 4 could be a multi-band mobile telephone unit with GSM/GPRS/EDGE/UMTS etc. capabilities and Mobile Host Unit Y 5 could be a computer terminal equipped with a number of WLAN/WMAN/WBMA/UWB etc. capabilities and the interface between the Mobile Host Units 6 could be for example wired, infrared, Bluetooth, ZigBee or an equipment internal interface. The distribution of the mobile host functionality of the current invention is not limited to the mobile host unit instances of the mobile host complex described above, it can also be allocated partly or completely to any other suitable platform.

Figure 2:
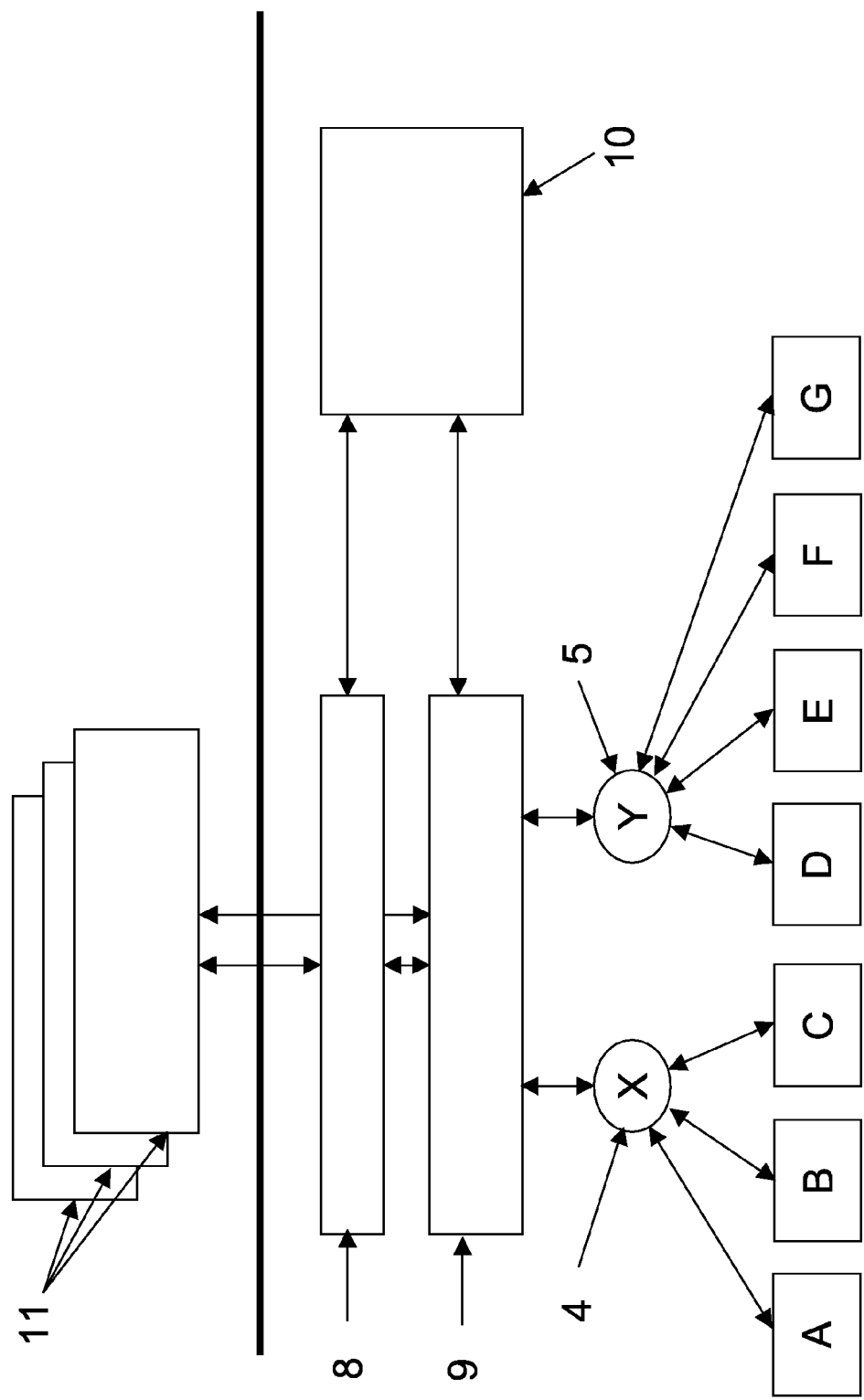
FIG. 2 is an explanatory drawing of the internal architecture of the mobile host.

The FIG. 2 shows the internal architecture of the Mobile Host. The User Applications 11 are offered the services of the heterogeneous network by accessing the Control Logic Function 8 and by accessing the Traffic Routing Function 9. The Control Logic Function 8 is the main responsible of establishment, teardown and reconfiguration of the connections within the heterogeneous network, and the Traffic Routing Functions 9 takes care of the actual routing of the traffic payload as instructed by the Control Logic Function 8. The Control and Measurement Database 10 is assisting the Control Logic Function 8 and the Traffic Routing Function 9 with the control parameters and the Quality of Service measurement results. The Mobile Host Unit entities X and Y (note that in this context they represent the interfaces, not the physical units) communicate towards the access networks A-C, D-G. The Medium Access Control layers within the access networks ensure the Quality of Service of the connections, as well as perform the Quality of Service measurements. The measurement results are then stored in the Control and Measurement Database 10.

Figure 3:
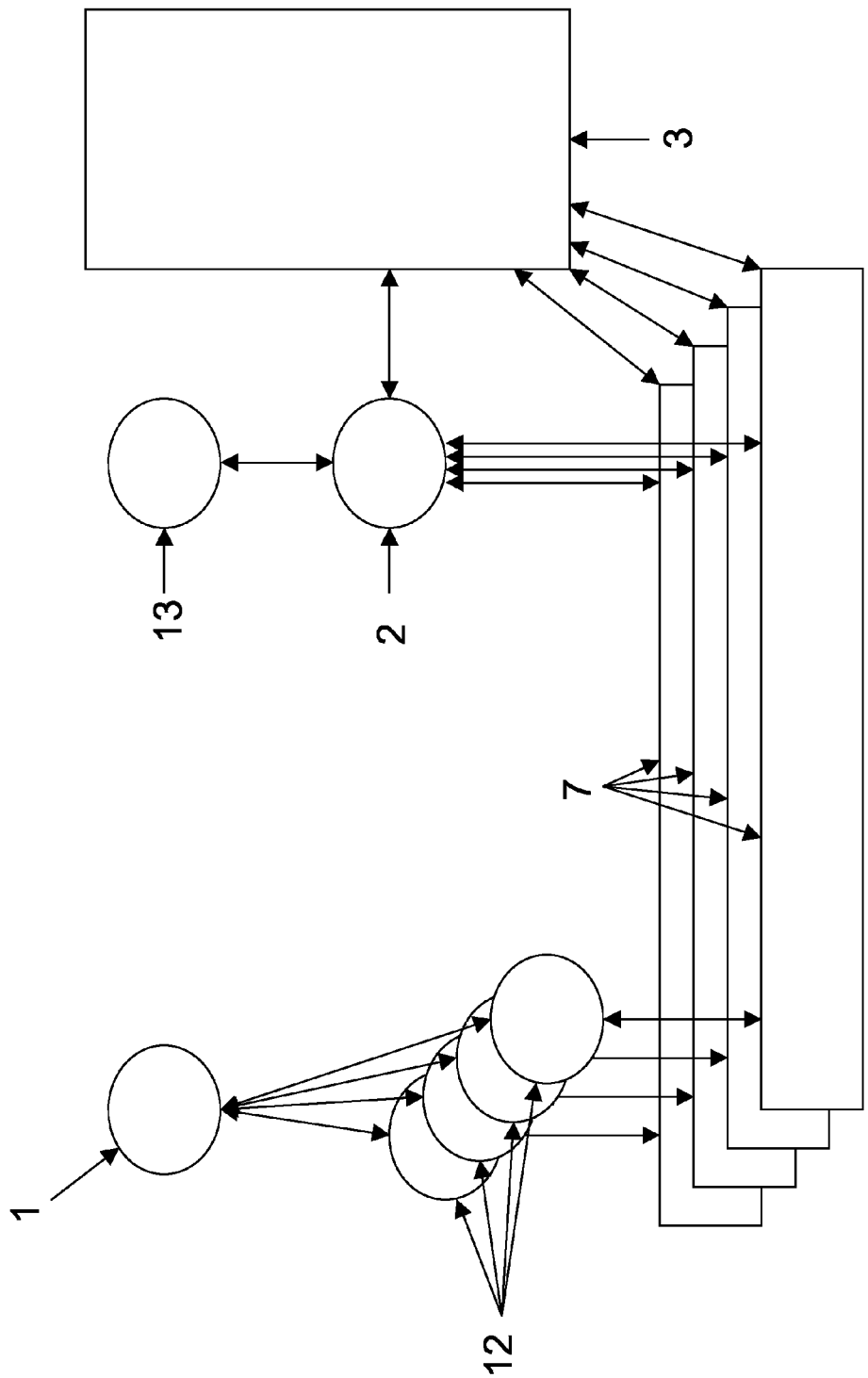
FIG. 3 is an explanatory architectural drawing of how the mobile host and the network node are interconnected over the heterogeneous network. The connections towards the external network and to the AAA (authentication, authorization and accounting) node are also shown.

The FIG. 3 shows the architectural overview on how the Mobile Host 1 is communicating with the Network Node 2 over the individual access networks 7 and their Access Points or Base Stations or wired accesses 12 and then the Network Node 2 is connected towards the external network 3 and towards the AAA (Authentication, Authorization and Accounting) node 13. Also the individual access networks 7 can have direct connections to the external network 3.

Figure 4:
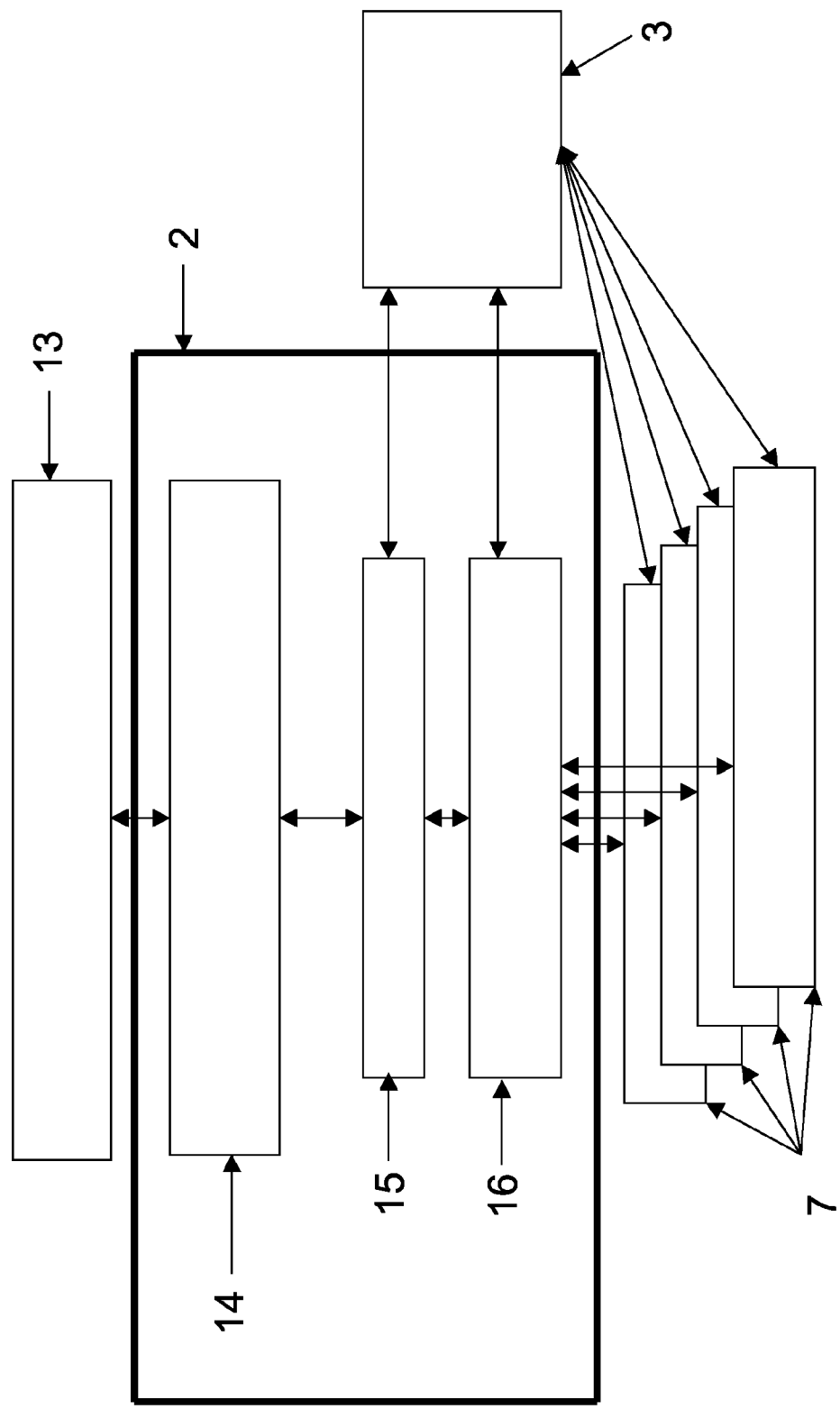
FIG. 4 is an explanatory drawing of the internal architecture of the network node.

The FIG. 4 shows the internal architecture of the network node 2. The AAA node 13 communicates using the AAA protocol interface function 14 with the control logic function 15. The control logic function communicates with external network 3 and traffic routing function 16, which is connected to the external network 3 and to access networks 7.

Figure 5:
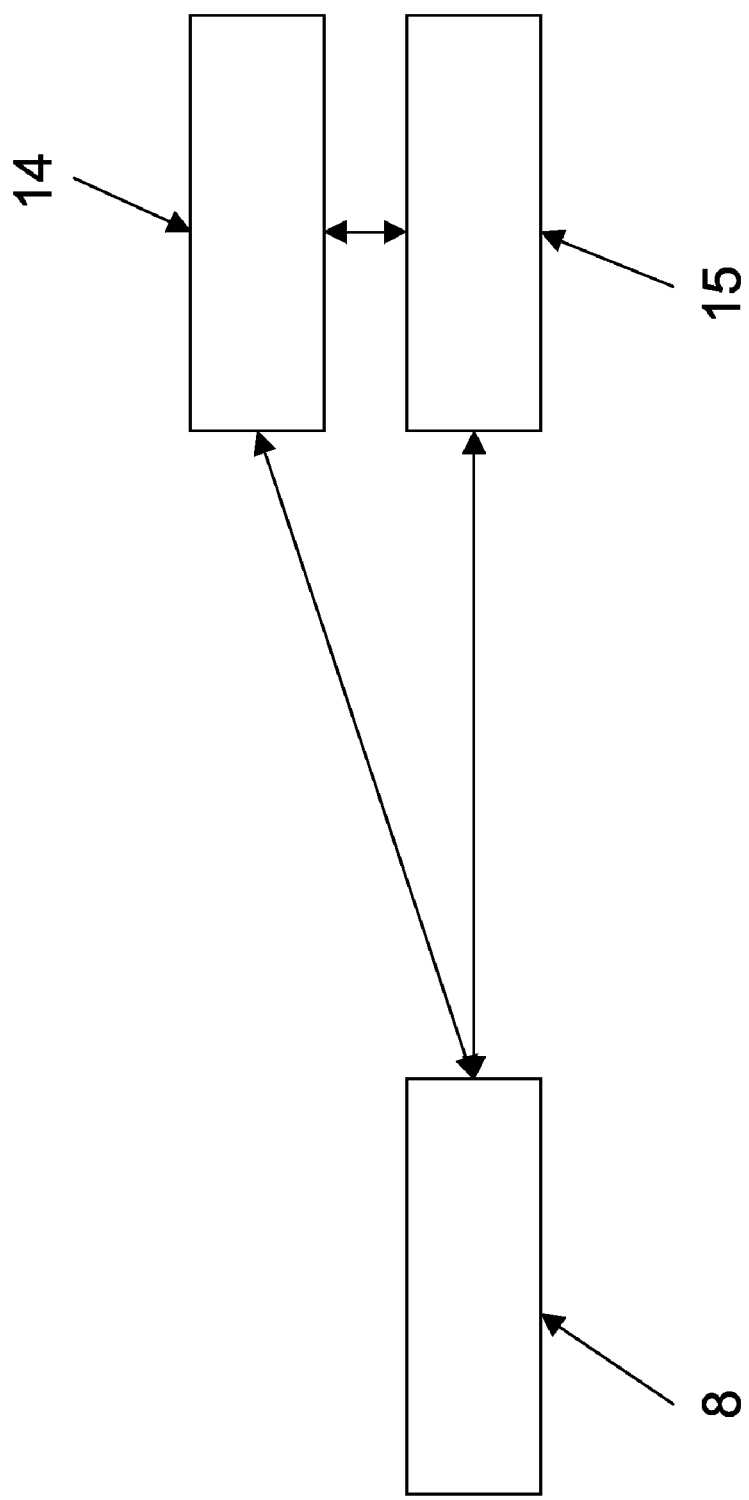
FIG. 5 is an architectural explanatory drawing of the interfaces between the entities within the network node and the mobile host.

The FIG. 5 shows the communication interfaces between the control logic function in the mobile host 8, the control logic function in the network node 15 and the AAA protocol interface function in the network node 14.

Figure 6:
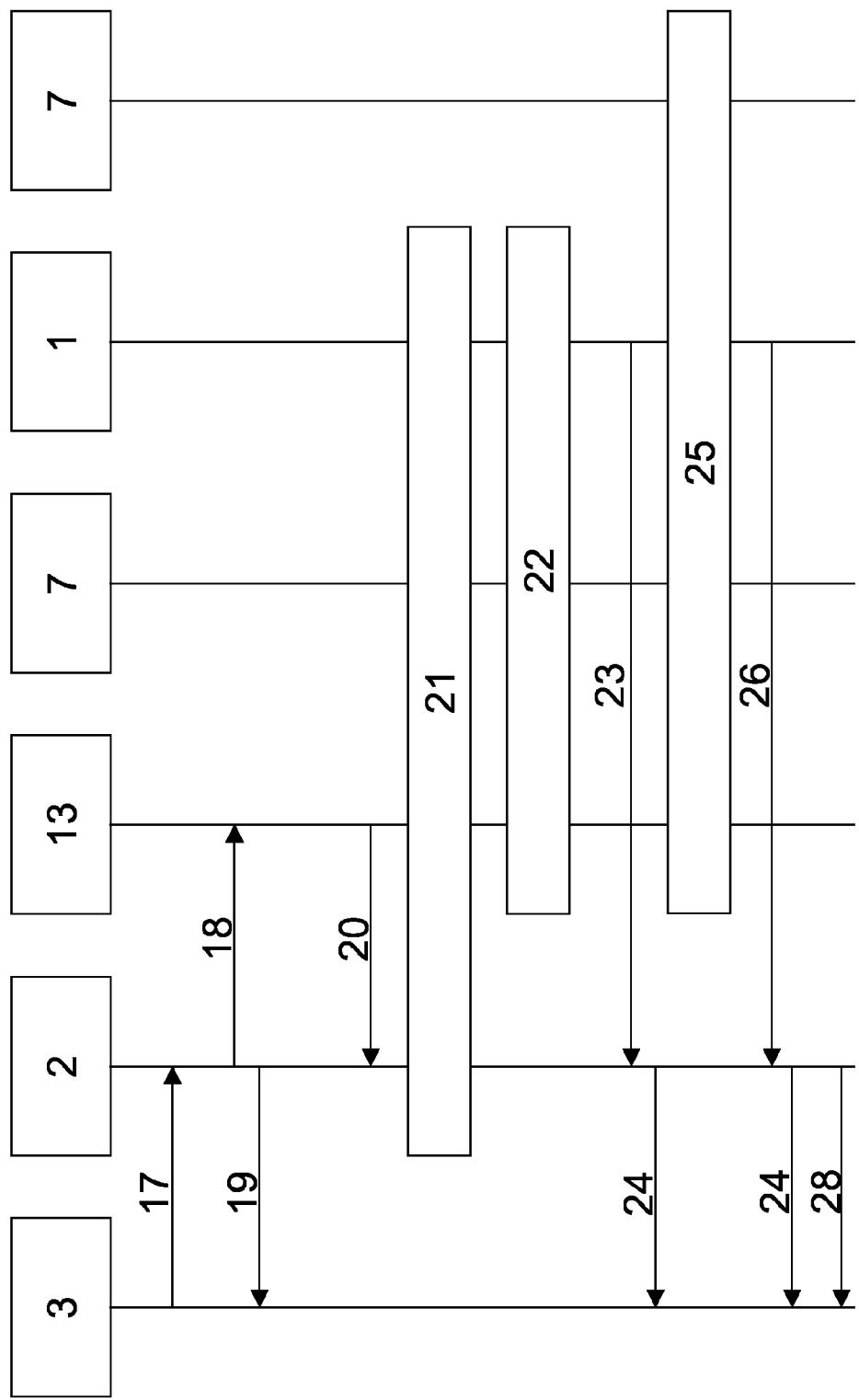
FIG. 6 is a message sequence diagram showing the network initiated session establishment procedure where in this example the connections are set up on two separate access network domains.
Figure 7:
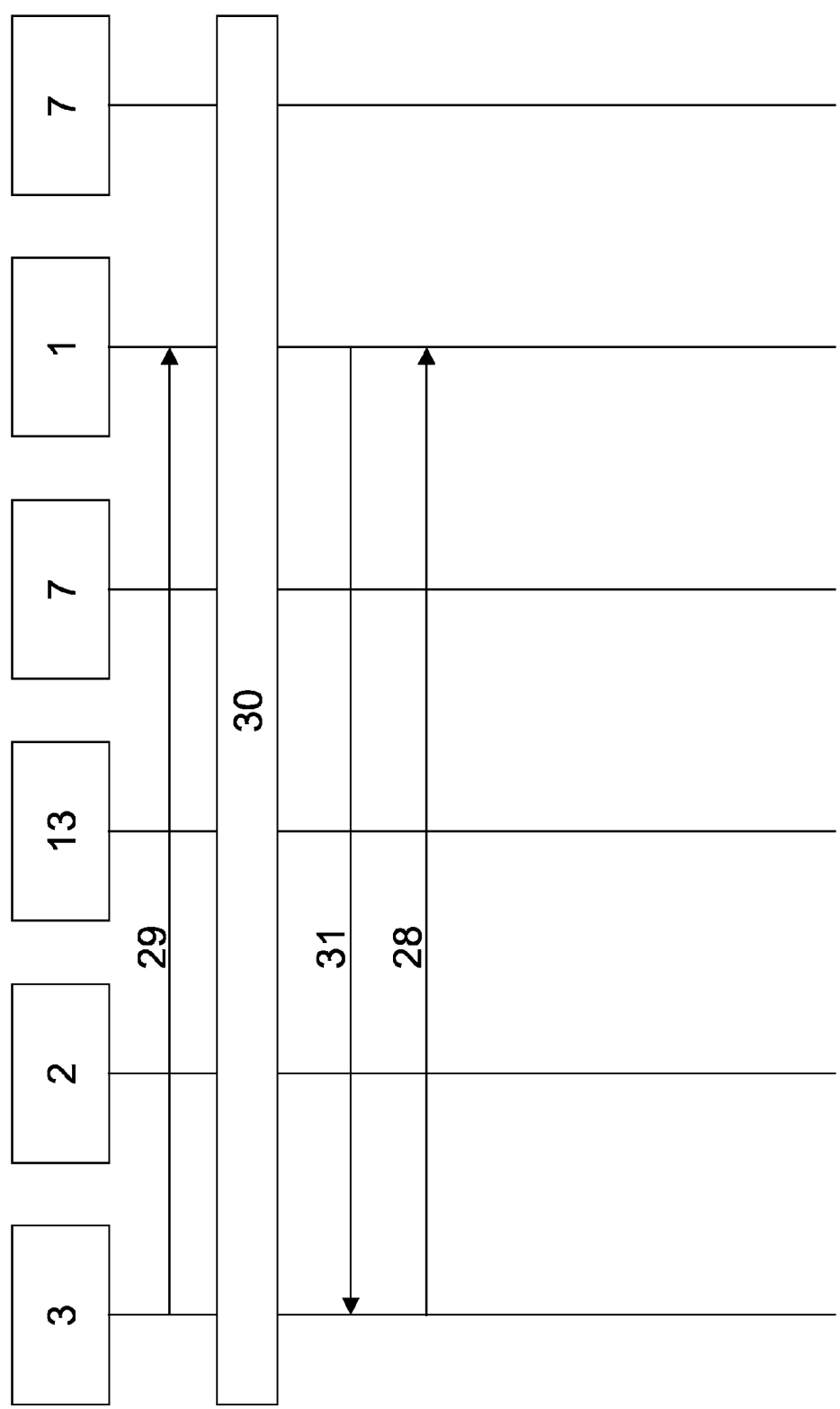
FIG. 7 is continuation of the sequence in FIG. 6.

The FIG. 6 and FIG. 7 show the message sequence chart of the network initiated session establishment procedure in the heterogeneous network. In this example the connections are set up using IETF protocols, such as SIP, SDP and other needed protocols, the connections can also be established by using other suitable protocols if so desired, and the connections can be for example packet or circuit switched. The sequence is used only to clarify the possible usage of the present invention. The Session Initiation Protocol SIP is described in IETF RFC 3261 and DIAMETER base protocol is described in IETF RFC 3588. The External Network 3 sends a SIP INVITE message containing the user identity 17 to the network node 2. Using the user identity the network node 2 sends a query message 18 to the AAA node 13 and sends a SIP 100 TRYING response to the caller in the external network 3. The AAA node 13 answers with message 20 containing information whether the user is authorized in the heterogeneous network and with a list of the candidate access networks with the user identities to be used in said access networks for establishment of the initial connection towards the mobile host. The network node 2 has functionality to go through the list in the order in which it is set up, and attempt to establish the initial connection to the mobile host 1 in each of the access networks 7. This is ended when said connection is established or all the candidates in the list have been tried. In the procedure 21 the initial communication is established towards the mobile host 1, the mobile host 1 informs the network node 2 of the available access networks 7 and the network node 2 with help from the AAA node 13 provides the mobile host 1 the needed data to be able to get access in the suitable access networks 7. In the procedure 22 the mobile host 1 accesses the first access network 7 the necessary preparations, such as authentication of the user in said network is done, and an identity is allocated for the user in that access network domain. The identity is sent from the mobile host 1 to the network node 2 in 23 and the network node 2 sends SIP 180 RINGING response 24 to the caller in the external network 3. The same procedure as in 22 and 23 is performed in another access network in 25 and 26, and after sending the SIP 180 RINGING response 24 the network node 2 sends a SIP 200 OK response 28 with the user identities in all of the access network 7 domains to the caller in the external network 3. The caller in the external network 3 sends SIP ACK messages 29 to the users in the mobile host 1, and the media sessions are established towards each of the user identities in the mobile host 1 in the procedure 30 using Session Description Protocol SDP (IETF RFC 2327) and resource reservation related protocols—this part is not described here in more detail. When the media session is over, the user in the mobile host 1 sends a SIP BYE message 31 to the caller in the external network 3, which responds with SIP 200 OK response 28.

Figure 8:
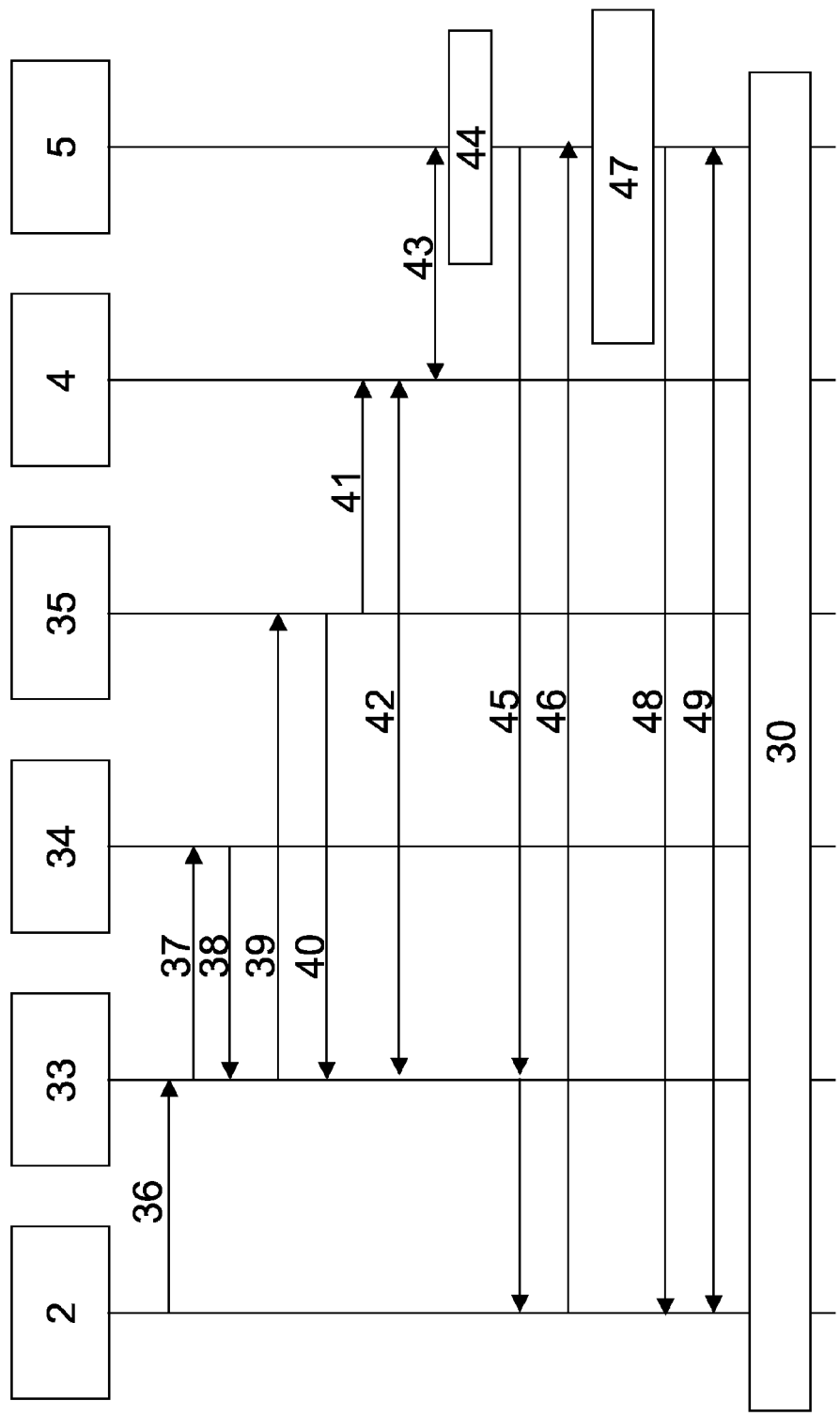
FIG. 8 is a message sequence chart describing in more detail a subset of FIG. 6, in this example the initial connection towards the mobile host is set up using GPRS network initiated PDP context activation procedure.

FIG. 8 shows in more detail an example of the sequence mainly shown in steps 21-30 in FIG. 6 and in FIG. 7, in this example the initial connection with the mobile host is set up using a GPRS network service. In this example the Mobile Host Unit X 4 has an active GPRS subscription, and has also network coverage and access to the GPRS network in question. The network node 2 sends a PDP PDU 36 to the Gateway GPRS Support Node GGSN 33, which sends a Mobile Application Part (MAP) Send Routing Information (SRI) message 37 to the Home Location Register (HLR) 34, and it responds back with a SRI ACK message 38 to the GGSN 33. Then the GGSN 33 sends a PDU Notification Request 39 message to the Serving GPRS Support Node (SGSN) 35, which responds back with PDU Notification Response 40 message. Then the SGSN (35) sends a Request PDP Context Activation message 41 to the mobile Host Unit X 4, and the PDP Context activation procedure is performed 42. Now the Mobile Host Unit X 4 and Mobile Host Unit Y 5 establish connection 43 and the Mobile Host Unit Y 5 performs scanning 44 of the available access networks, and sends to GGSN 33 a message 45 which is containing information of the available access networks 7 together with their QoS characteristics and control information from the control and measurement database 10 in the mobile host 1. The GGSN 33 sends the message 45 further to the network node 2. The network node 2 together with the AAA node 13 process the contents of the message 45 and respond back to Mobile Host Unit Y 5 with a message 46 containing a list of the access network 7 candidates together with the QoS contracts and authentication and authorization information for each network. The Mobile Host Unit Y 5 performs preparations, such as authentication of the user in the access networks in question, for roaming into the access networks 7 using said information and gets user identities in the access network domains and QoS information in 47, which the Mobile Host Unit Y 5 then sends to the network node 2 in a message 48, the network node forks the SIP INVITE message to said user identities in 49, and the media sessions are established and resources allocated in the needed networks towards all of said user identities 30.

Figure 9:
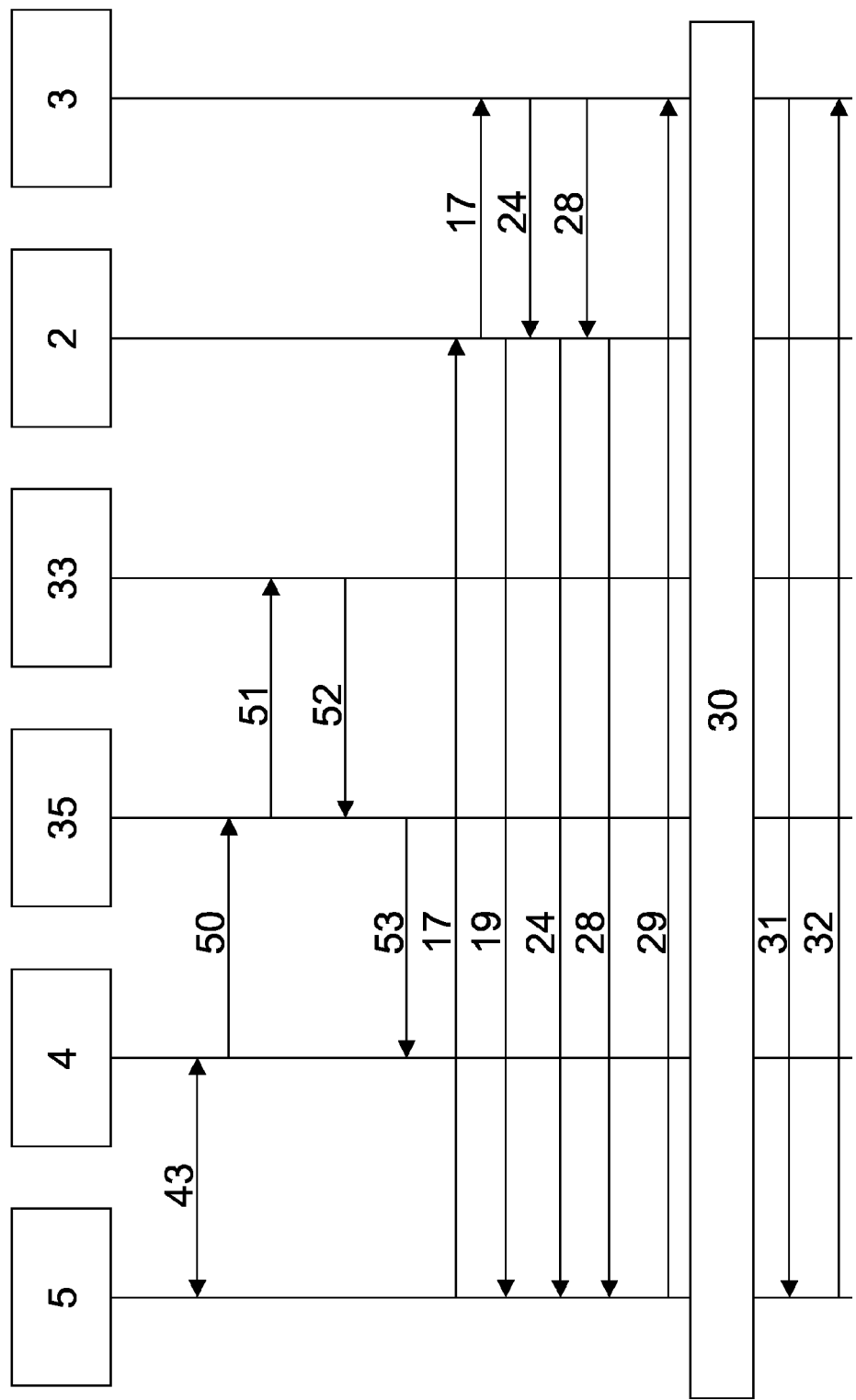
FIG. 9 is a message sequence chart showing the mobile host initiated session establishment procedure in the heterogeneous network. In this example the user identities within each access network domain are known in advance in the mobile host.

FIG. 9 shows the message sequence chart of an example where the sessions are initiated at the mobile host. In the example the mobile host has already been prepared for roaming in the access network, such as it has been authenticated and authorized in the access networks in question, and the needed user identities in each access network domains are known in advance in the mobile host. Also in this particular example the GPRS network is used as the bearer of the messages from the mobile host to the network node, in the current invention any available access network being able to establish communication between the mobile host and the network node can be used for an authenticated and authorized mobile host for the network signaling purposes in the heterogeneous network. The sequence starts where the Mobile Host Unit Y 5 initiates a communication 43 with the Mobile Host Unit X 4, which sends an Activate PDP Context message 50 to the SGSN 35, which sends a Create PDP Context Request message 51 to the GGSN 33. The GGSN (33) responds back to SGSN 35 with a Create PDP Context Response message 52 and the SGSN 35 sends an Activate PDP Context Accept message 53 to the Mobile Host Unit X 4. Here the Mobile Host Unit Y 5 and the network node 2 have an established communication (some, for an ordinary skilled person familiar with the field, trivial messages are not shown here due to drawing technical reasons). In order to ease the reader to map the following messages with the IETF SIP Specification RFC 3261, one could use the analogy of having each user identity in the mobile host 1 as an UAC, and the network node 2 could be seen as an UAS. Note that this is just an example; the current invention is not limited to this analogy by any means. In the following example the sessions in the mobile host 1 are initiated at the Mobile Host Unit Y 5. The Mobile Host Unit Y 5 sends a SIP INVITE message 17 to the network node 2, which sends a SIP INVITE message 17 to the external network 3 and sends a SIP 100 TRYING response 19 to the Mobile Host Unit Y 5. The external network 3 responds with a SIP 180 RINGING response 24 to the network node 2, which sends a SIP 180 RINGING response 24 to the Mobile Host unit Y 5. The external network 3 sends a SIP 200 OK response 28 to the network node 2, which sends a SIP 200 OK response 28 to the Mobile Host Unit Y 5. The sequence here from the SIP INVITE message 17 from the Mobile Host Unit Y 5 to the network node 2 to the SIP 200 OK response 28 from the network node 2 to the Mobile Host Unit Y 5 is performed for all user identities, and when this has been done, the Mobile Host Unit Y 5 sends a SIP ACK message 29 to the external network 3. After that the actual media sessions are established between the user identities in the mobile host 1 and the called party in the external network 3 in the procedure 30, the details of which are not shown here more deeply. The sessions are terminated when the called party in the external network 3 sends a SIP BYE message 31 to the Mobile Host Unit Y 5, which responds with a SIP 200 OK response 32 to the external network 3.

Figure 10:
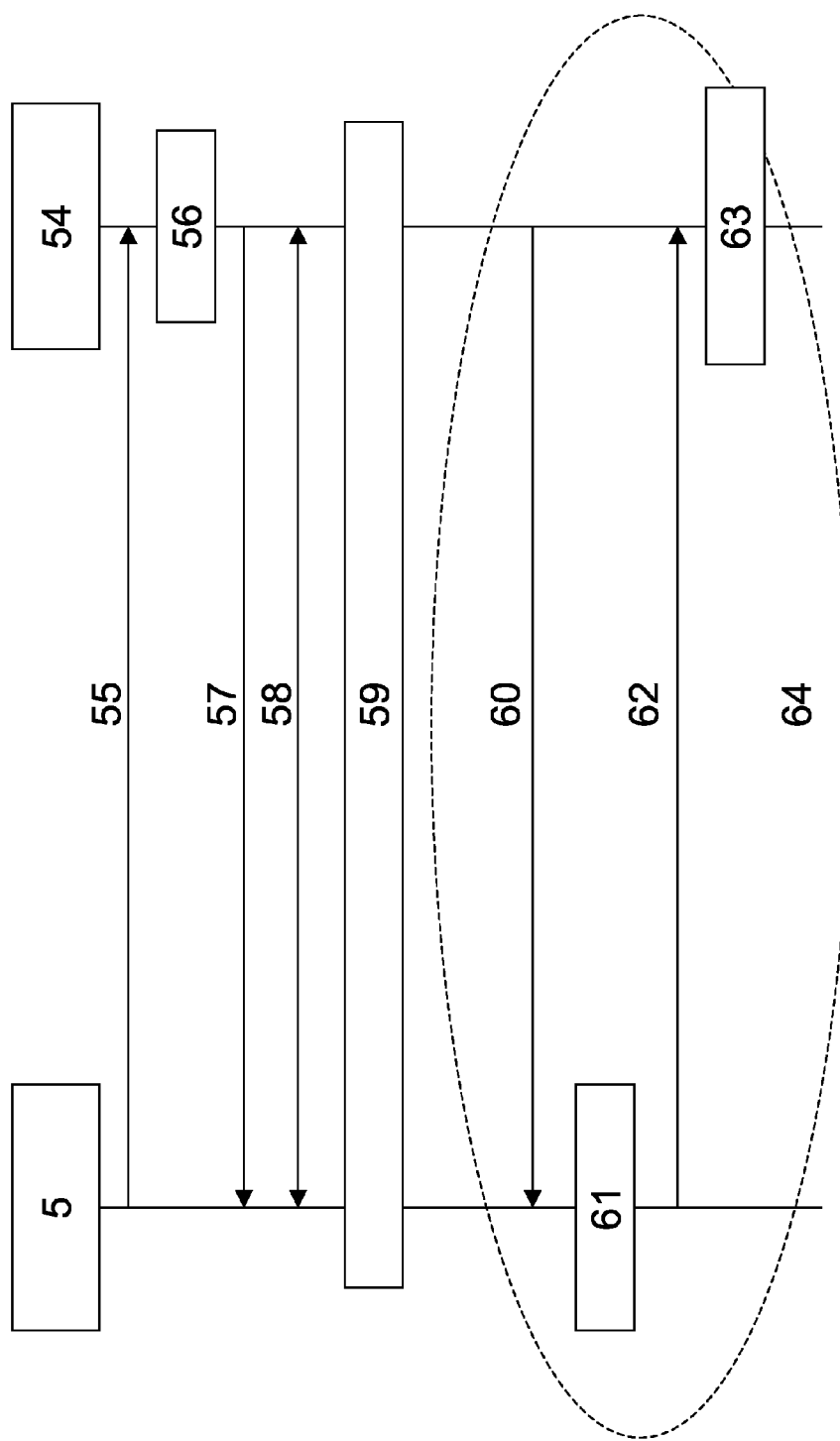
FIG. 10 is a message sequence chart that gives an example of the mobile host and an access point in a wireless access network; in this case the access point is a 802.11x WLAN AP supporting a QoS mechanism principles as specified in 802.11e.

FIG. 10 is a message sequence chart of an example of signaling between the Mobile Host Unit Y 5 and the IEEE 802.11x WLAN access point 54 supporting the IEEE 802.11e QoS mechanism principles. The details of how the QoS mechanisms are supported in other access network techniques (like for example 802.16, 802.20, 802.15 UWB and UMTS PS RABs) can be varying, but the basic principles used in this example can be used also in the other access network technologies. The Mobile Host unit Y 5, which in this 802.11e enabled WLAN access network contains a quality of service enabled station QSTA, and is authenticated in the 802.11 access network in question and is associated with the access point 54, sends a 802.11 MAC Management Action message ADDTS QoS Action Request 55 containing QoS request information in the form of Traffic Stream parameters to the 802.11e quality of service enabled (QAP) access point 54, and the access network performs a process 56 where the user is authorized and the contents of the QoS request being analyzed with help from the admission control as known by persons familiar with the field. Then the QAP access point 54 responds with a 802.11 MAC Management Action message ADDTS QoS Action Response 57 with supported available QoS offerings information to the Mobile Host Unit Y 5, which can respond with a new ADDTS sequence 58 containing the required QoS allocation information if in the response ADDTS QoS Action Response 57 result code suggested changes in the creation of the requested traffic stream. After the Traffic Stream has been successfully established, then a procedure 59 is executed, in which the connections are established, QoS control and measurement information negotiated between the Mobile Host Unit Y 5 and access point 54. As an example of using parameterized QoS services as supported in 802.11e, here is explained the behaviour of the system during the operation of the actual session, in which the access point performs controlled channel access (HCCA) negotiations 64, which consist of the items 60-63. The message 60 is a CAP QoS (+) CF-poll containing the results of the QoS measurements done at the AP 54 side, the results of which the Mobile Host Unit Y 5 store in the procedure 61 into the control and measurement database 10, then message 62 is QoS (+) CF-ACK with QoS measurement results from the Mobile Host Unit Y 5, which then the AP 54 processes in 63. A person familiar on the field is aware that 802.11e also has support to other QoS mechanisms, such as distributed channel access (EDCA), which are not explained here in this example.

Figure 11:
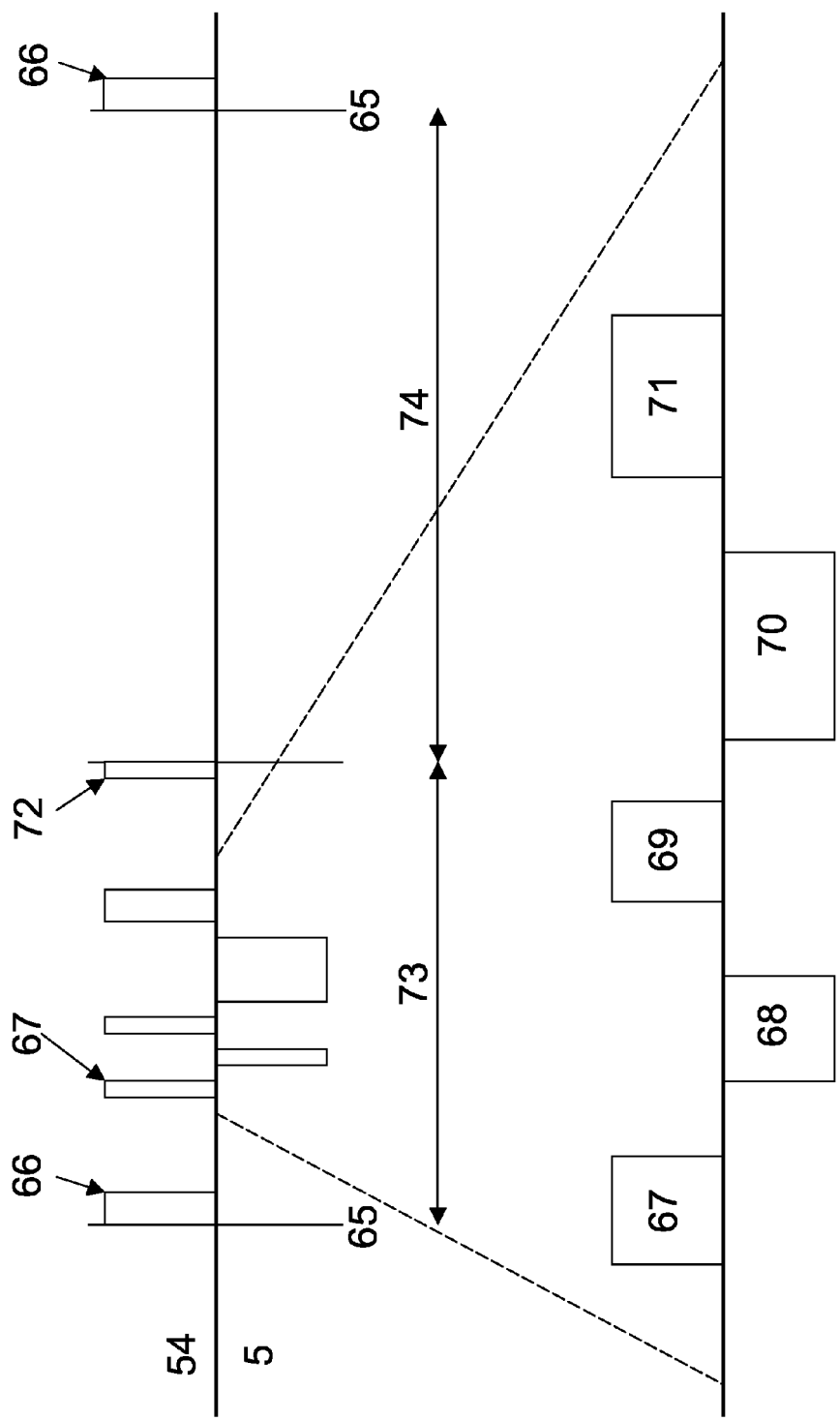
FIG. 11 is a graphical presentation of the signaling details on the physical radio interface described in FIG. 10.

FIG. 11 shows in more detail how the information is sent between the Mobile Host Unit 5 and the access point 54 within the 802.11e frame structure. The target Beacon transmission Time 65 is the points of time indicated with the Beacons 66, and within the time between the beacons 66 the contention free period 73 and contention period 74 form a structure called a superframe. The periodical QoS negotiation is performed at the contention free period 73, which is at the highest priority in the transmission on the link which guarantees that the information transfer is done always in predetermined time. The sequence starts with CF-QoS poll 67 sent by the access point 54, which the Mobile Host Unit Y 5 responds with Request To Send (RTS) 68, and access point sends a Clear To Send (CTS) 69, then Mobile Host Unit Y 5 sends QoS information in MSDU 70, and the access point sends it's data piggy-backed in the ACK message 71, the contention free period ends at CF-end 72. The transmission of the QoS enabled traffic is done in the contention period 74. Note that the contention free period 73 is optional.

Figure 12:
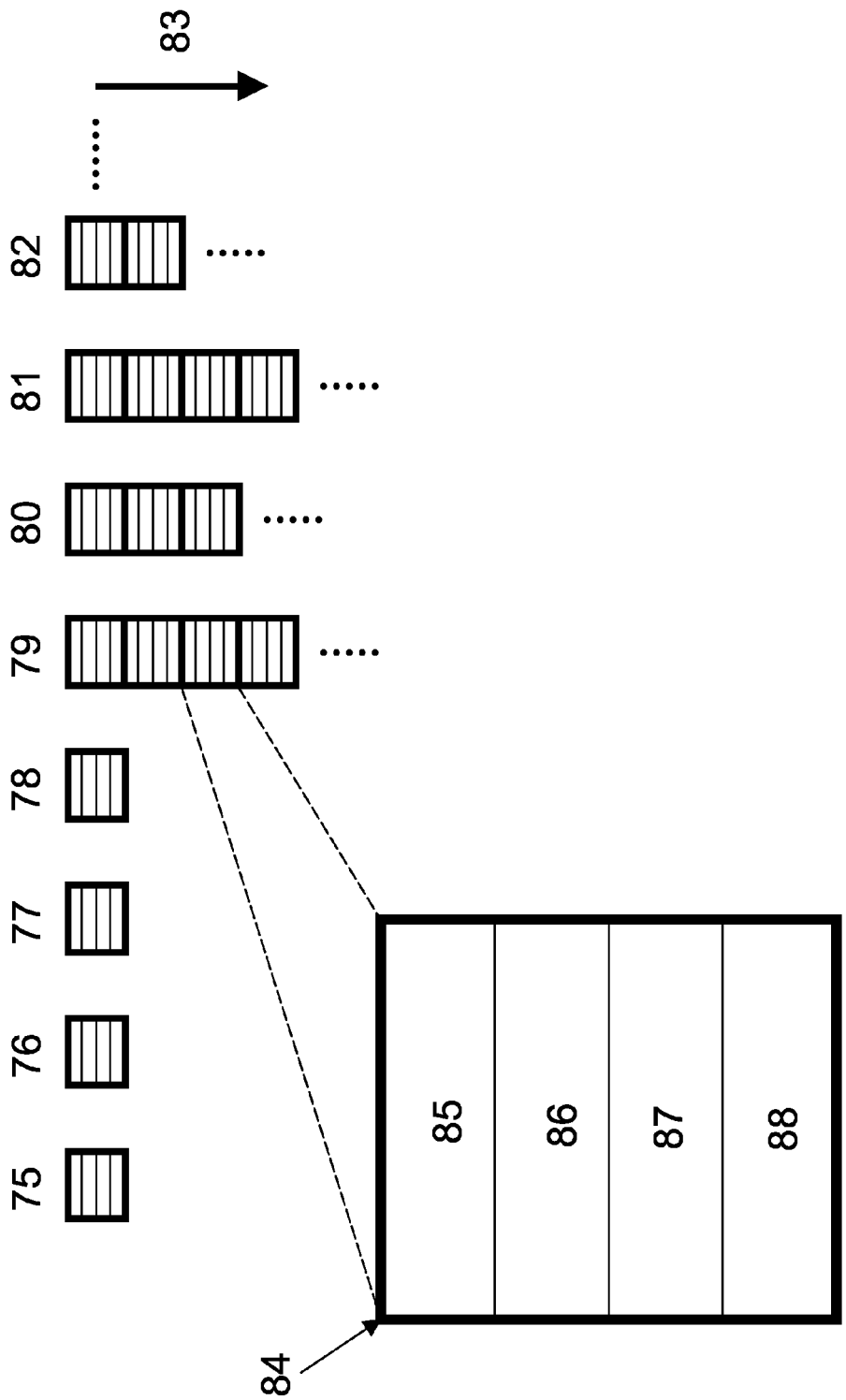
FIG. 12 is an architectural overview of the data structures within the control and measurement database function in the mobile host.

FIG. 12 shows the architectural structure of the control and measurement database in the mobile host; in this particular example the items 75-82 represent different access network technologies. The arrow 83 indicates different overlapping networks; this means that in some technologies it could be possible to access several different access networks simultaneously if so desired, if the capabilities of the mobile host are allowing that approach, or alternatively to select one of them. The different networks in question could be for example operated by different network operators. As an example the access network technologies could be the following: 75 GSM circuit switched voice, 76 GSM circuit switched data, 77 GPRS/EDGE, 78 3G WCDMA (UMTS), 79 IEEE 802.11a, b, g or n, 80 IEEE 802.16, 81 IEEE 802.20 and 82 IEEE UWB or wired access. The item 84 shows in more detail one instance of a database record showing the internal structure of the data stored per access network. The record 84 has internal structure of four elements, 85-88, each of which are in this example configuration storing the data per the QoS priority classes. So 85 is the data stored per highest QoS priority class, 86 for the higher QoS priority class, 87 for the medium QoS priority class and 88 for the lower QoS priority class. The current invention is not limiting the number of QoS priority classes, it is a commonly used practice to have 4 different priority classes and that is why four classes are used here also. Each of the elements 85-88 store at least the following information: Initial QoS parameter values, Measured QoS parameter values for both AP and mobile host, Threshold QoS parameter values, Limit QoS parameter values, Credits value, operator specific credits factor and the user identity used within the particular access network domain. The minimum set of QoS parameters consist of data throughput, delay and jitter values. The data throughput shows the amount of data transmitted over the connection in a certain period of time, the delay value shows the amount of time the data packets are in average stored in the sending buffers of the access technology implementations (for example in layer 2 buffers) before they are actually scheduled for transmission and transmitted successfully, the jitter values show then statistical variance of the delay values respectively. In short the above listed QoS parameter values are handled in the following way: The initial QoS parameter values store the SLA (service level agreement) based QoS information of the specific network, this data can for example be fetched from the AAA node at the initial setup of the network connections in this particular access network, or stored manually by the end user. The measured QoS values are obtained as described in the example in FIG. 10 and in FIG. 11. The meaning of the threshold QoS values are to serve as a checkpoint indicating whether the credits value of this particular connection are counted upwards or downwards. The limit QoS values indicate the measured QoS situation where the credits of the connection are immediately set to zero and connection re-routing is force started. The credits value is an artificial number showing how well the access network is fulfilling the QoS requirements, as mentioned above. If the QoS measurements are above the QoS threshold values, the credits are counted upwards, otherwise they are counted downwards. Also the counting speeds are different in each direction, enabling fast recovery in case of possible problems in the connection. The operator specific credits factor is used to enable the end user to have a means to create personalized preferences of the networks, for example due to different charging policies or other reasons. The utilization of the credits values at the operation is the following: At connection establishment the mobile host scans the available networks, multiplies the credits values with the operator specific credits factors and the one having the highest result is the primary access network candidate for further connection establishment as described in FIG. 8. During operation if the credits value multiplied with the fall below a certain threshold, the connection re-routing is initiated as described in FIG. 13, and if the values are below the limit values the connection is immediately released and possible connection rerouting is initiated, whereas in the previous case a new connection is established first and the old one is released after the new connection has taken over the traffic.

Figure 13:
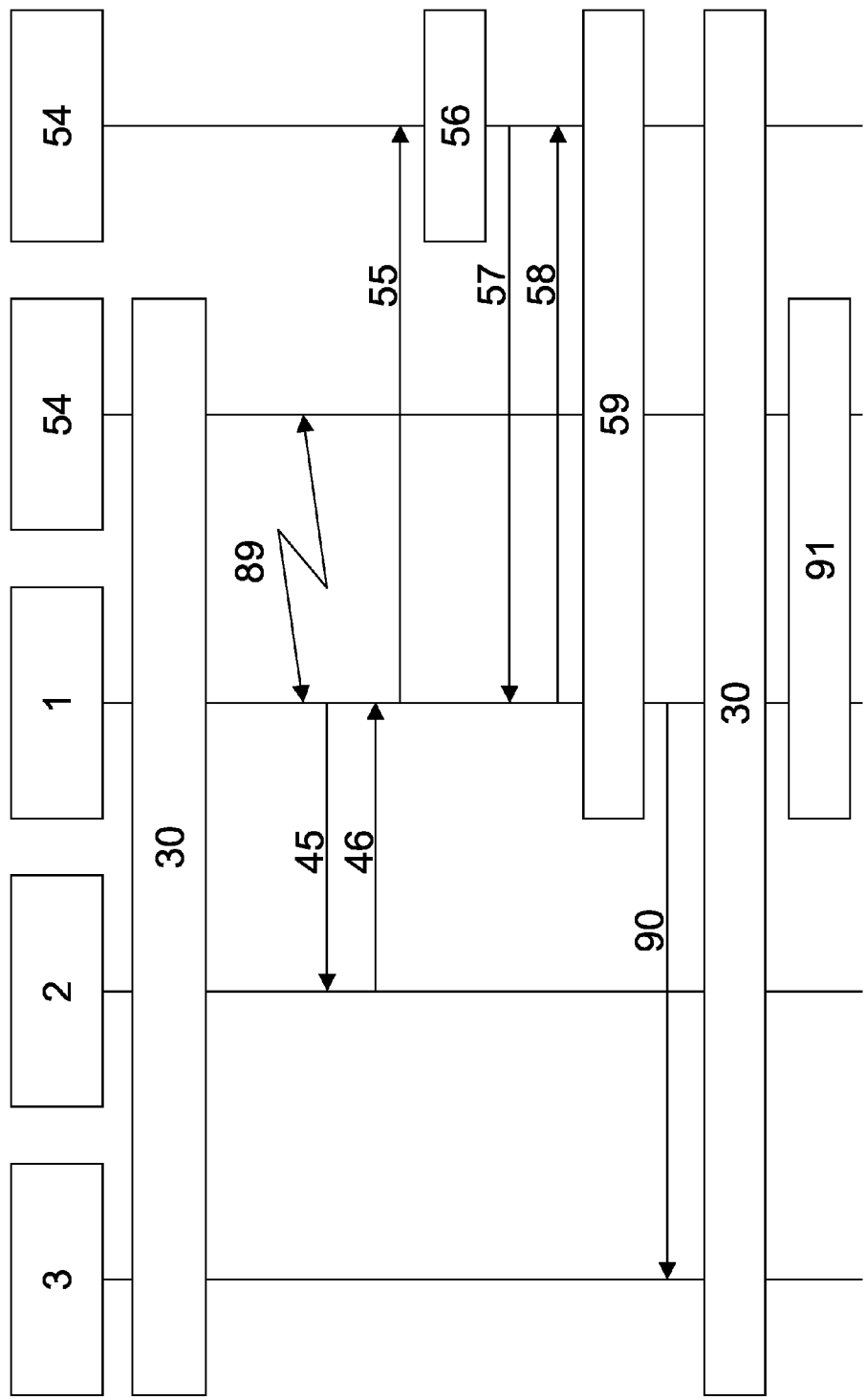
FIG. 13 is a message sequence chart showing an example of a procedure where an existing connection in one access network is re-routed into another access network initiated by detection of degraded quality of service.

FIG. 13 is a message sequence chart showing an overview of the situation where an existing connection over one access network is reconfigured due to decreased quality of service into another access network. The sequence starts in a situation where the media session 30 in question is established between the external network 3 and the mobile host 1 over the access point 54 in the first access network. The QoS measurements done during the service of the connection indicate in 89 that the credits of the connection multiplied with the operator specific credits factor have fallen below a threshold value, and connection re-routing activities are invoked. The mobile host 1 requests from the network node 2 with a message 45 for authorization information of the best credit values owning available access network, being called hereon as the second access network, and then the network node 2 responds with 46 message containing the QoS contract values of the second access network, and authorization information for the second access network, the mobile host sends a message 55 containing authorization information for the second access network and QoS request information to the access point 54 in the second access network, and the second access network performs a process 56 where the user is authorized and the contents of the QoS request being analyzed. Then the access point 54 in the second access network responds with a response message 57 with supported available QoS offerings information to the mobile host 1 which responds with a message 58 containing the required QoS allocation information. Then a procedure 59 is executed, in which the connections are established, QoS control and measurement information negotiated between the mobile host 1 and the access point 54 in the second access network. The mobile host 1 sends a message 90 to the external network with information about the new connection established over the second access network. In procedure 30 the connection is routed from the first access network to the second access network, and in procedure 91 the connection over the first access network is released.

The invention claimed is:

1. A mobile host in a heterogeneous network system that integrates communication systems, the heterogeneous network system providing support for a communication between the mobile host and a network node in a heterogeneous network over a plurality of access networks, wherein the mobile host provides a common platform for the plurality of access networks, the mobile host comprising:
   means for performing periodical and event based quality of service measurements on an established connection between a quality of service enabled transmitting and receiving entity in the mobile host and a quality of service enabled receiving and transmitting entity in one of the plurality of access networks, such that the quality of service is measured as at least one of data throughput in bits/s, data transmission delay, data transmission jitter, data packet loss rate, and data packet error rate, wherein the quality of service measurements being the local Quality of Service measurements that are used in the decisions to perform connection reconfigurations within the heterogeneous network during traffic;
   means for requesting information regarding a service level agreement for one of the plurality of access networks from the network node in the heterogeneous network, said service level agreement information comprising quality of service information;
   control and measurement database means for storing said service level agreement information and results of said quality of service measurements;
   traffic routing means for performing one of releasing and re-establishing the established connection; and
   control logic means for invoking the traffic routing means based on said quality of service information and said service level agreement information stored via the control and measurement database means of the mobile host;
   wherein support for the communication between the mobile host and the plurality of access networks occurs simultaneously.

2. The mobile host according to claim 1, said heterogeneous network system further comprising:
   means for establishing an initial connection between the mobile host and the network node in the heterogeneous network system, wherein the initial connection is established using the plurality of access networks.

3. The mobile host according to claim 2, wherein the mobile host is authenticated and authorized in said heterogeneous network system by using said initial connection established between the mobile host and the network node in said heterogeneous network system.

4. The mobile host according to claim 2, wherein the mobile host and the network node each have means for encrypting said initial connection established between said mobile host and the network node in the heterogeneous network system.

5. The mobile host according to claim 2, wherein the mobile host is provided a plurality of authorization and authentication information from the network node using said initial connection established between the mobile host and the network node, said plurality of authentication and authorization information being used by the mobile host for authentication and authorization of the mobile host to the plurality of access networks supporting said heterogeneous network system.

6. The mobile host according to claim 1, further comprising:
   means for collecting the quality of service measurements results.

7. The mobile host according to claim 1, further comprising:
   means for performing access network selection based on scanned identities of the access networks, said measured quality of service information from said quality of service enabled transmitting and receiving entity in the mobile host and from said quality of service enabled receiving and transmitting entity in one of the plurality of access networks and said service level agreement information stored via the control and measurement database means;
   wherein the quality of service information is received from the network node or is based on a combination of information elements, and is adjustable according to parameters stored via the control and measurement database means.

8. A heterogeneous network system that integrates communication systems, the heterogeneous network system providing support for a communication between a mobile host and a network node in a heterogeneous network over a plurality of access networks the mobile host comprising:
   means for performing periodical and event based quality of service measurements on an established connection between a quality of service enabled transmitting and receiving entity in the mobile host and a quality of service enabled receiving and transmitting entity in one of the plurality of access networks, such that the quality of service is measured as at least one of data throughput in bits/s, data transmission delay, data transmission jitter, data packet loss rate, and data packet error rate, wherein the quality of service measurements being the local Quality of Service measurements that are used in the decisions to perform connection reconfigurations within the heterogeneous network during traffic;
   means for requesting information regarding a service level agreement for one of the plurality of access networks from the network node in the heterogeneous network, said service level agreement information comprising quality of service information; wherein said mobile host comprises:
   a control and measurement database module for storing said service level agreement information and results of said quality of service measurements;
   a traffic routing module for performing one of releasing and re-establishing the established connection; and
   a control logic module for invoking the traffic routing module based on said quality of service information and said service level agreement information stored in the control and measurement database module of the mobile host;
   wherein support for the communication between the mobile host and a the plurality of access networks occurs simultaneously.

9. The heterogeneous network system according to claim 8, further comprising:
   means for performing access network selection based on scanned identities of the access networks, said measured quality of service information from said quality of service enabled transmitting and receiving entity in the mobile host and from said quality of service enabled receiving and transmitting entity in one of the plurality of access networks and said service level agreement information stored via the control and measurement database means;

wherein the quality of service information is received from the network node or is based on a combination of information elements, and is adjustable according to parameters stored via the control and measurement database means.

10. The heterogeneous network system according to claim 8, said heterogeneous network system further comprising:

a module for establishing an initial connection between the mobile host and the network node in the heterogeneous network system, wherein the initial connection is established using the plurality of access networks.

11. The heterogeneous network system according to claim 10, wherein upon establishing a communication initiated by an external network with the mobile host in the heterogeneous network, the network node supports selecting an access network for the establishing of the initial connection, and wherein information needed for the selecting is made available to the control logic module by an AAA (Authentication, Authorization and Accounting) protocol interface module.

12. The heterogeneous network system according to claim 10, wherein said network node and the mobile host each have means for encrypting said initial connection established between said mobile host and the network node in the heterogeneous network system.

13. The heterogeneous network system according to claim 10, wherein said network node provides support to the mobile host for-establishing a communication to the plurality of access networks using said initial connection between the network node and mobile host.

14. The heterogeneous network system according to claim 8, wherein said network node provides support for a communication between the mobile host and an AAA (Authentication, Authorization and Accounting) node in the heterogeneous network.

15. The heterogeneous network system according to claim 10, wherein the mobile host further comprises:

means for collecting the quality of service measurements results.

16. The heterogeneous network system according to claim 10, wherein said service level agreement information comprises a selection of the quality of service information.

17. The heterogeneous network system according to claim 16, wherein the mobile host further comprises:

means for performing access network selection based on scanned identities of the access networks, said quality of service information and said service level agreement information stored via the control and measurement database module;

wherein the quality of service information is received from the network node or is based on a combination of information elements, and is adjustable according to parameters stored via the control and measurement database module.

18. The mobile host of claim 1, wherein the established connection is dynamically reconfigured to sustain the quality of service information.

19. The heterogeneous network system of claim 8, wherein the established connection is dynamically reconfigured to sustain the quality of service information.

* * * * *